(12) United States Patent
Ravindranathan et al.

(10) Patent No.: US 11,140,182 B2
(45) Date of Patent: Oct. 5, 2021

(54) PREDICTIVE ANOMALY HANDLING IN A SERVICE PROVIDER SYSTEM

(71) Applicant: Optum, Inc., Minnetonka, MN (US)

(72) Inventors: Rama S. Ravindranathan, Basking Ridge, NJ (US); Rick A. Hamilton, Minneapolis, MN (US); Guerino Bonetti, Basking Ridge, NJ (US); Patrick E. Bergstrom, Eden Prairie, MN (US)

(73) Assignee: Optum, Inc., Minnetonka, MN (US)

( * ) Notice: Subject to any disclaimer, the term of this patent is extended or adjusted under 35 U.S.C. 154(b) by 344 days.

(21) Appl. No.: 16/245,858

(22) Filed: Jan. 11, 2019

(65) Prior Publication Data

US 2020/0228550 A1    Jul. 16, 2020

(51) Int. Cl.
| | |
|---|---|
| *H04L 29/06* | (2006.01) |
| *H04L 12/26* | (2006.01) |
| *G06N 20/00* | (2019.01) |
| *H04L 29/08* | (2006.01) |

(52) U.S. Cl.
CPC ......... *H04L 63/1425* (2013.01); *G06N 20/00* (2019.01); *H04L 43/0817* (2013.01); *H04L 43/16* (2013.01); *H04L 67/22* (2013.01); *H04L 67/306* (2013.01)

(58) Field of Classification Search
CPC ............. H04L 63/1425; H04L 43/0817; H04L 67/306; H04L 67/22; H04L 43/16; H04L 41/5035; H04L 41/5009; H04L 41/507; G06N 20/00
USPC ......................................................... 726/22
See application file for complete search history.

(56) References Cited

U.S. PATENT DOCUMENTS

| | | | |
|---|---|---|---|
| 7,343,406 B1 | 3/2008 | Buonanno et al. | |
| 9,942,266 B2 | 4/2018 | Holden et al. | |
| 10,291,638 B1* | 5/2019 | Chandana | G06F 7/24 |
| 2014/0219429 A1 | 8/2014 | Pasquale et al. | |
| 2015/0180894 A1 | 6/2015 | Sadovsky et al. | |
| 2017/0324866 A1 | 11/2017 | Segre et al. | |

OTHER PUBLICATIONS

Nokia, *Autonomous Customer Care—Solution Sheet* [article, online], 2017, [retrieved Apr. 10, 2019], retrieved from the Internet: <URL: https://networks.nokia.com/solutions/autonomous-care> (5 pages).

* cited by examiner

*Primary Examiner* — Tu T Nguyen
(74) *Attorney, Agent, or Firm* — Alston & Bird LLP

(57) ABSTRACT

There is a need for solutions that perform predictive natural language processing with improved efficiency and/or accuracy. This need can be addressed by, for example, by detecting an anomaly condition in the service provider system based on affected user activity data items associated with the service provider system; determining affected user profiles, wherein each affected user profile is predicted to experience the anomaly condition; determining, for each group of affected user profiles, affected user intentions based user activity data items associated with the group of affected user profiles; generating a support communication for each affected user profile in the group of affected user profiles based on the affected user intentions for the group; and causing a transmission of each support communication to each affected user profile in the group of affected user profiles.

19 Claims, 9 Drawing Sheets

```
1    {"user":{"name":"Dave Johnson","
2    email":"djohnson@djohnson.com","
3    phone":"123-456-7890","
4    preferredContact":"phone"},
5    {"requestDetails":{"system":"OptumRX",
6    "request":"/refill","
7    errorMessage":"Timeout at IRIS"},
8    {"requestFulfilled":{"refill":"Order Complete"}
```

FIG. 9

PREDICTIVE ANOMALY HANDLING IN A SERVICE PROVIDER SYSTEM

BACKGROUND

Complex service provider systems typically provide services related to a large number of service requests initiated by a large number of users by utilizing a large number of service provider components. Anomalies in operations of such complex systems, such as failure of the systems to retrieve valuable data or enable users to modify valuable data, can lead to huge costs for both users of computerized service provider systems and for organizations that provide services through computerized service provider systems. Thus, there is a continuing need for anomaly handling solutions that reduce costs of anomalies, and improve customer experience in complex service provider systems for users and service providers.

BRIEF SUMMARY

In general, embodiments of the present invention provide methods, apparatus, systems, computing devices, computing entities, and/or the like for predictive anomaly handling in a computerized service provider systems. Certain embodiments utilize systems, methods, and computer program products that enable proactive anomaly handling in service provider systems through predicting the intent of affected users of such systems based on particular past activities of those affected users.

In accordance with one aspect, a method is provided. In one embodiment, the method comprises detecting an anomaly condition in the service provider system based on one or more affected user activity data items associated with the service provider system; determining one or more affected user profiles, wherein each affected user profile of the one or more affected user profiles is predicted to experience the anomaly condition; determining, for each of one or more first affected user profiles of the one or more affected user profiles, one or more affected user intentions based on one or more first user activity data items associated with the first affected user profile, wherein the one or more first user activity data items associated with the first affected user profile are selected from the one or more affected user activity data items; generating a first support communication for each first affected user profile of the one or more affected user profiles based on the one or more affected user intentions for the first affected user profile; and causing a transmission of each first support communication for a first affected user profile of the one or more affected user profiles.

In accordance with another aspect, a computer program product is provided. The computer program product may comprise at least one computer-readable storage medium having computer-readable program code portions stored therein, the computer-readable program code portions comprising executable portions configured to detect an anomaly condition in the service provider system based on one or more affected user activity data items associated with the service provider system; determine one or more affected user profiles, wherein each affected user profile of the one or more affected user profiles is predicted to experience the anomaly condition; determine, for each of one or more first affected user profiles of the one or more affected user profiles, one or more affected user intentions based on one or more first user activity data items associated with the first affected user profile, wherein the one or more first user activity data items associated with the first affected user profile are selected from the one or more affected user activity data items; generate a first support communication for each first affected user profile of the one or more affected user profiles based on the one or more affected user intentions for the first affected user profile; and cause a transmission of each first support communication for a first affected user profile of the one or more affected user profiles.

In accordance with yet another aspect, an apparatus comprising at least one processor and at least one memory including computer program code is provided. In one embodiment, the at least one memory and the computer program code may be configured to, with the processor, cause the apparatus to detect an anomaly condition in the service provider system based on one or more affected user activity data items associated with the service provider system; determine one or more affected user profiles, wherein each affected user profile of the one or more affected user profiles is predicted to experience the anomaly condition; determine, for each of one or more first affected user profiles of the one or more affected user profiles, one or more affected user intentions based on one or more first user activity data items associated with the first affected user profile, wherein the one or more first user activity data items associated with the first affected user profile are selected from the one or more affected user activity data items; generate a first support communication for each first affected user profile of the one or more affected user profiles based on the one or more affected user intentions for the first affected user profile; and cause a transmission of each first support communication for a first affected user profile of the one or more affected user profiles.

BRIEF DESCRIPTION OF THE SEVERAL VIEWS OF THE DRAWINGS

Figure 1:
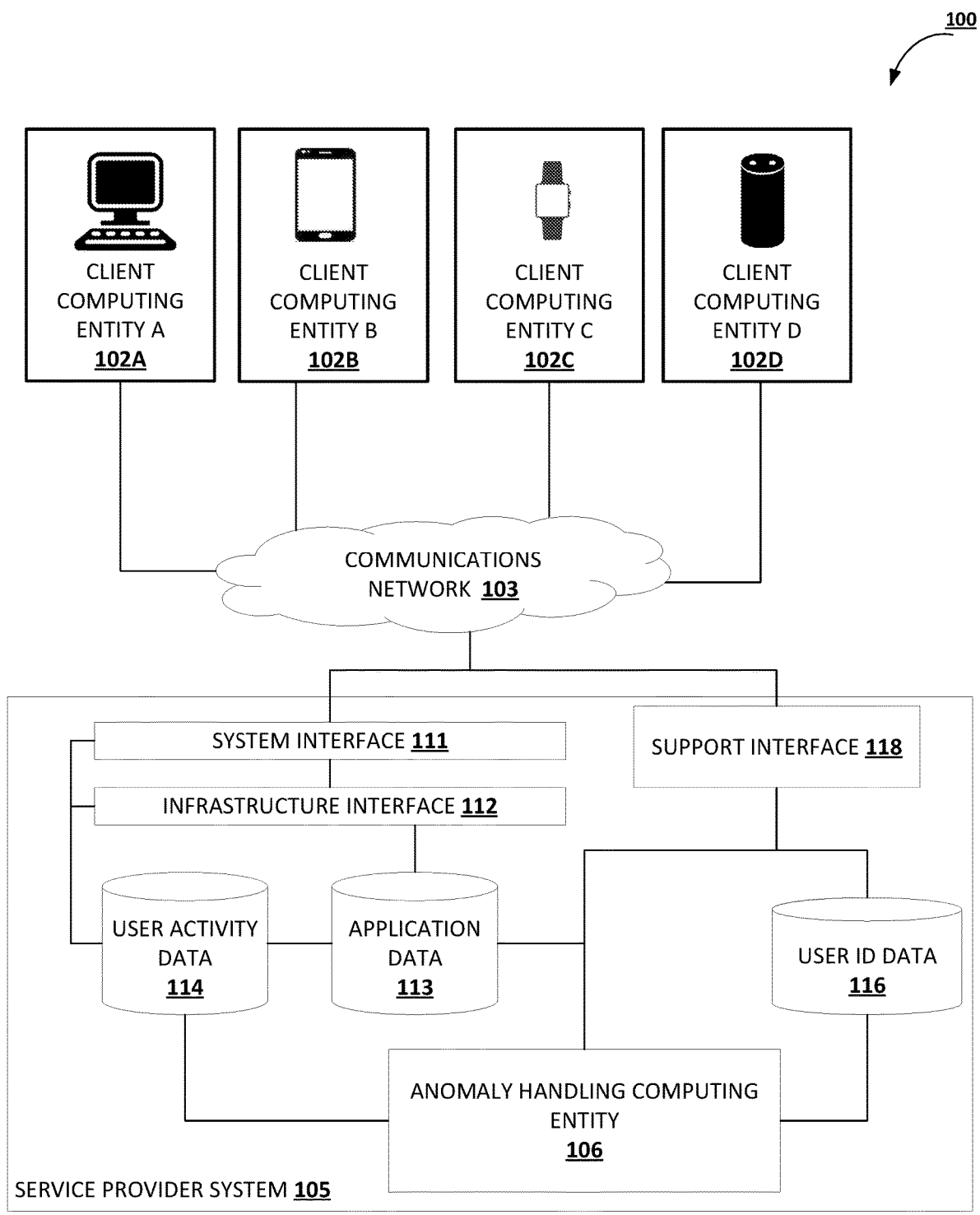

Having thus described the invention in general terms, reference will now be made to the accompanying drawings, which are not necessarily drawn to scale, and wherein:

FIG. 1 is an exemplary overview of an architecture that can be used to practice embodiments of the present invention.

Figure 2:
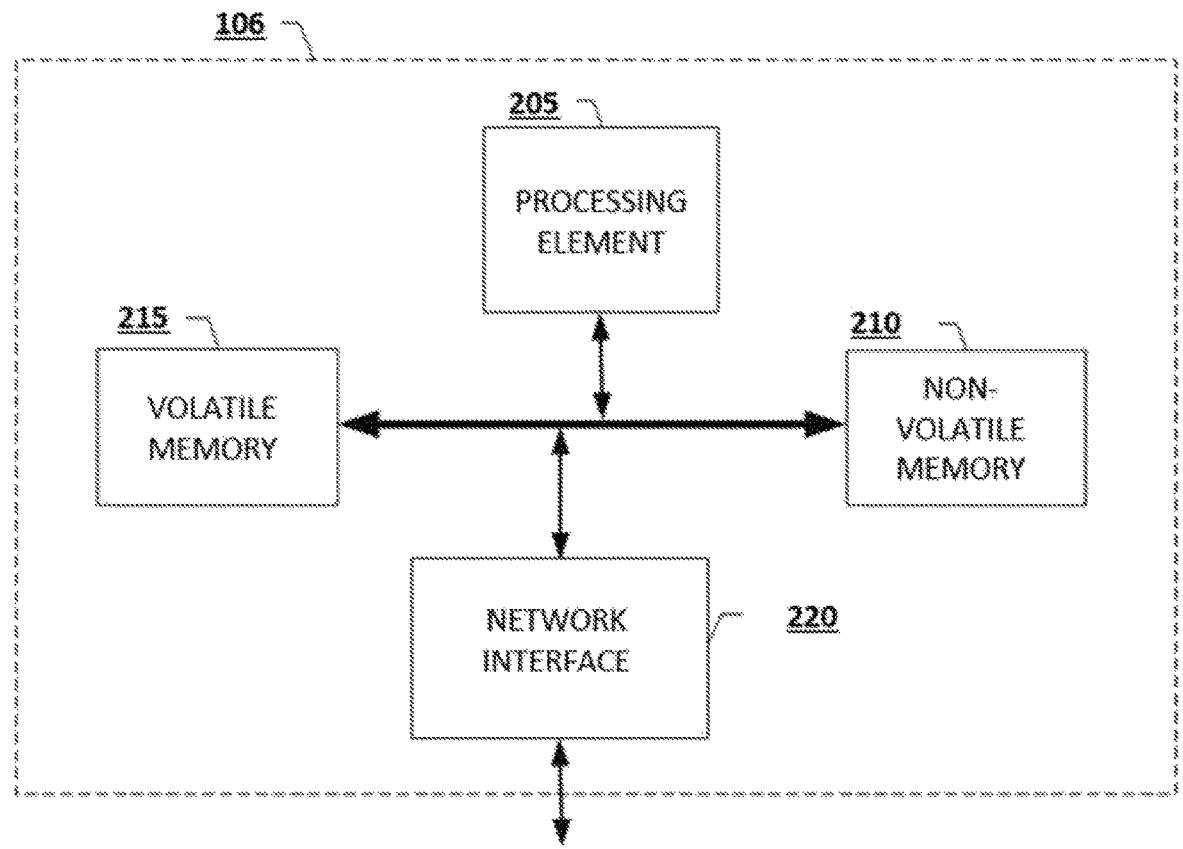

FIG. 2 illustrates an example anomaly handling computing entity in accordance with some embodiments discussed herein.

Figure 3:
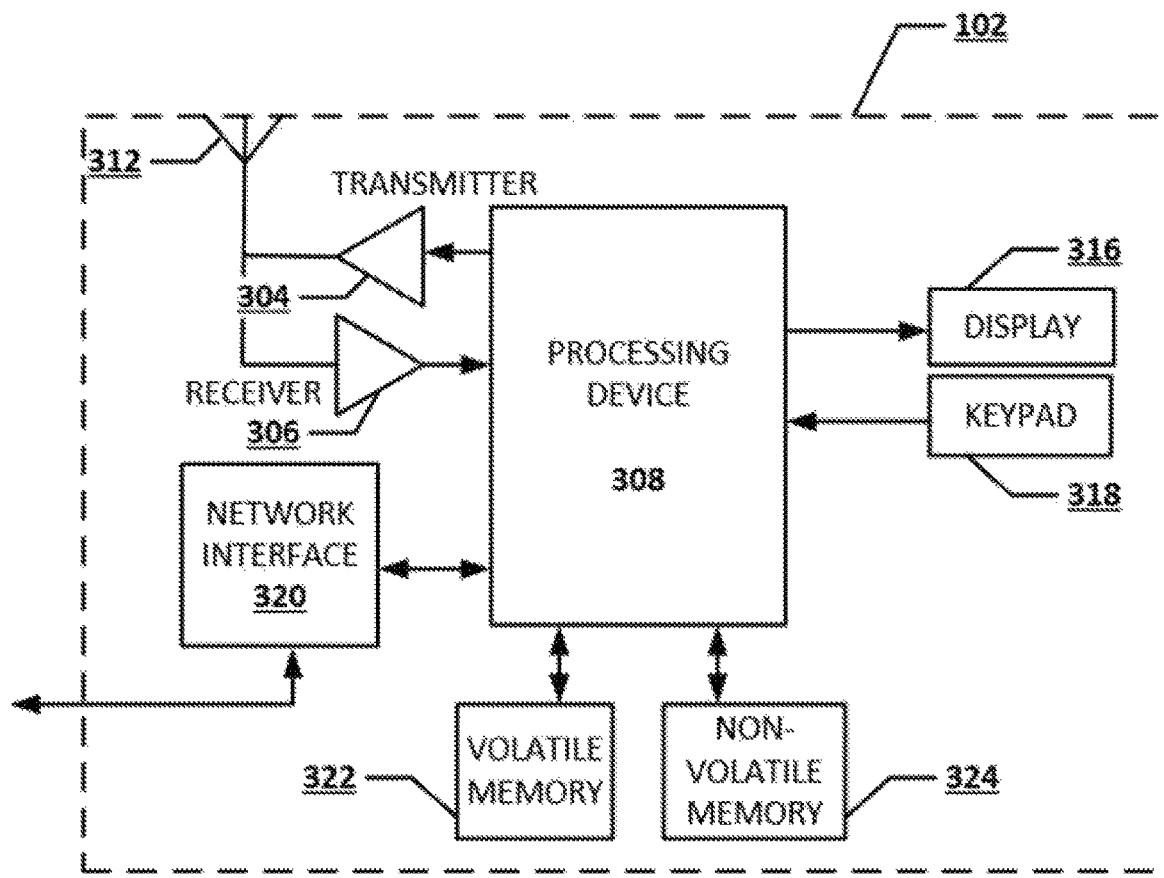

FIG. 3 illustrates an example client computing entity in accordance with some embodiments discussed herein.

Figure 4:
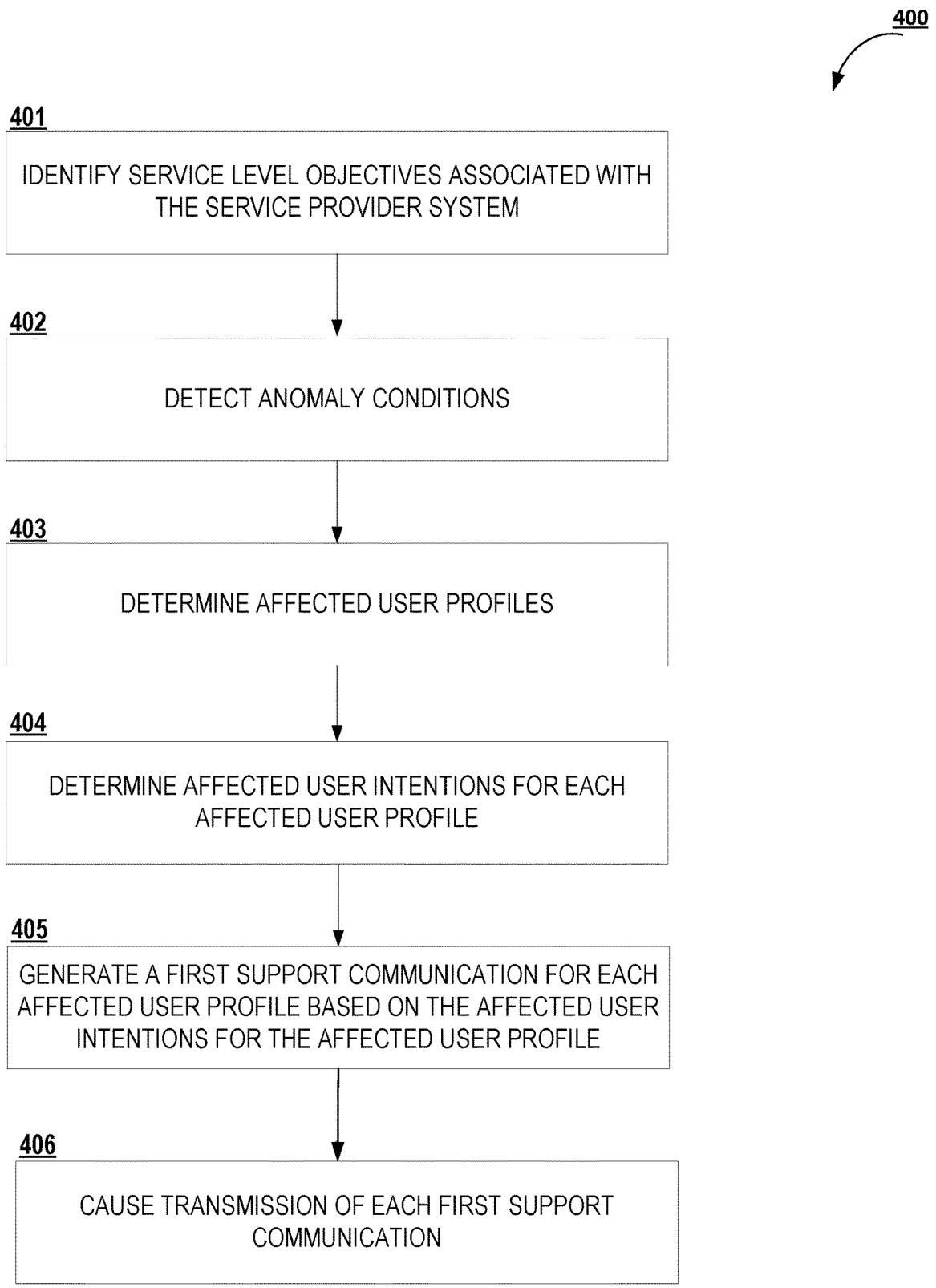

FIG. 4 depicts a flowchart diagram of a process for performing predictive anomaly handling in accordance with some embodiments discussed herein.

Figure 5:
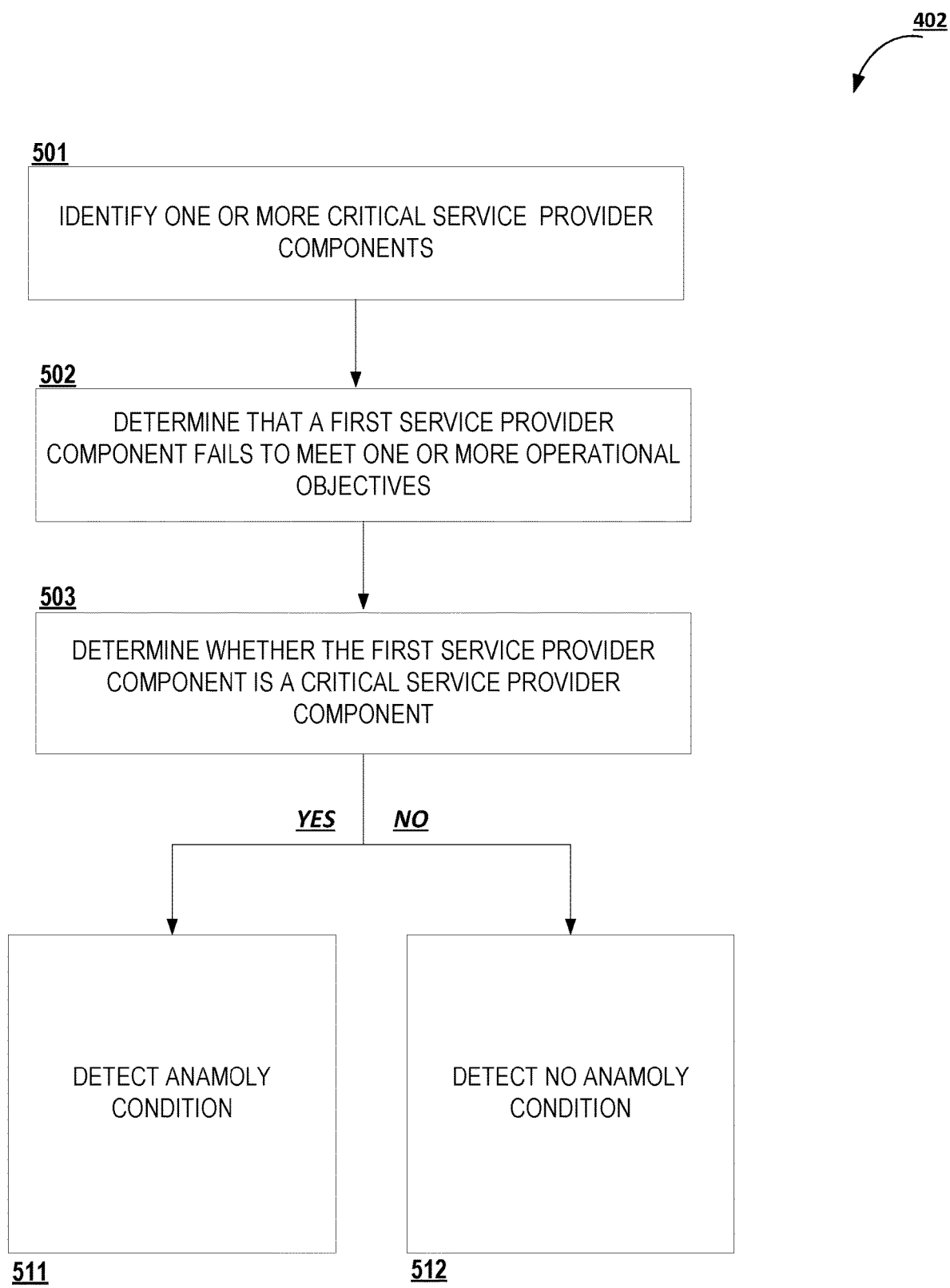

FIG. 5 depicts a flowchart diagram of a process for predicting an anomaly condition in accordance with some embodiments discussed herein.

Figure 6:
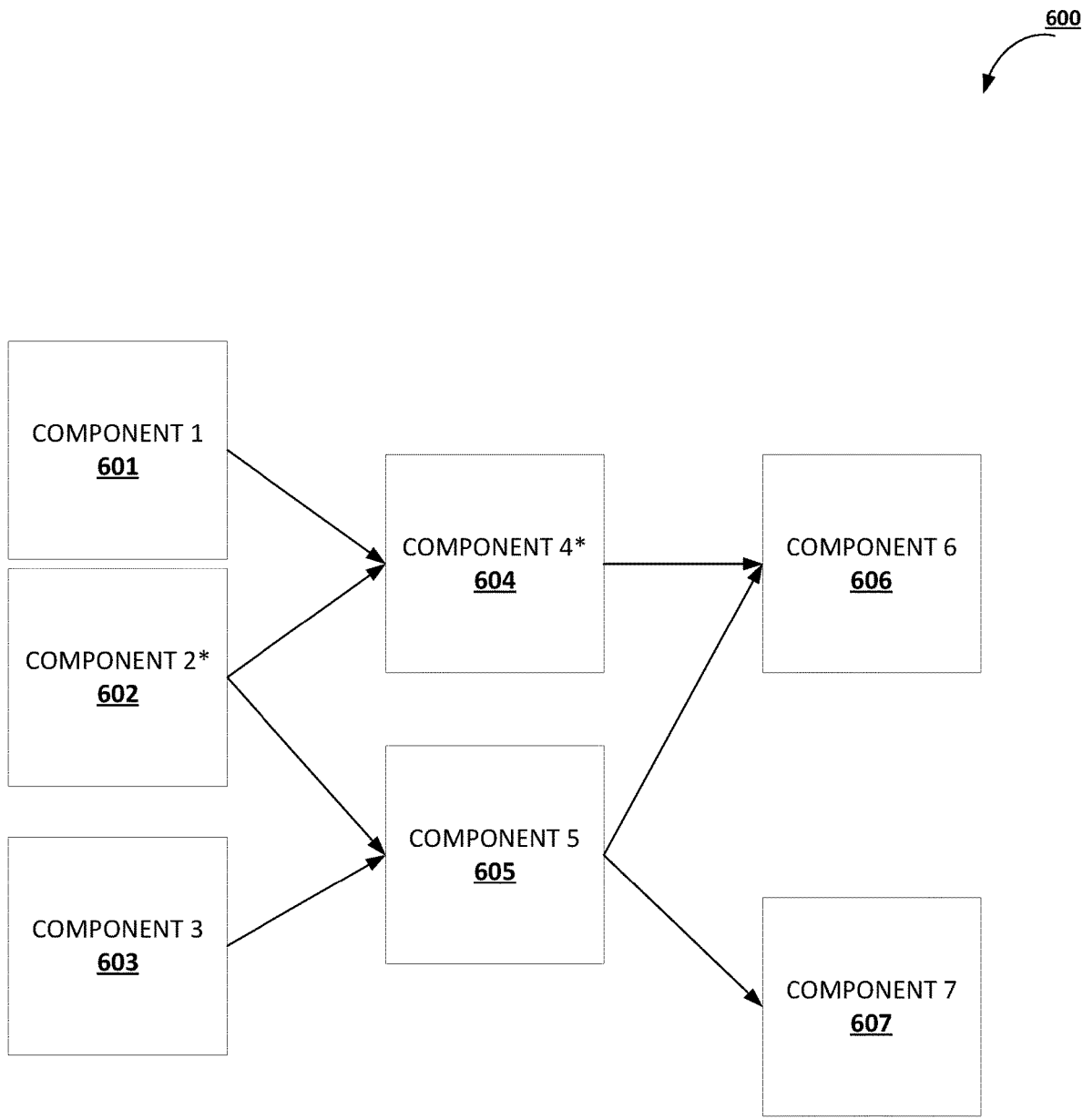

FIG. 6 provides an operational example of a functional dependency graph in accordance with some embodiments discussed herein.

Figure 7:
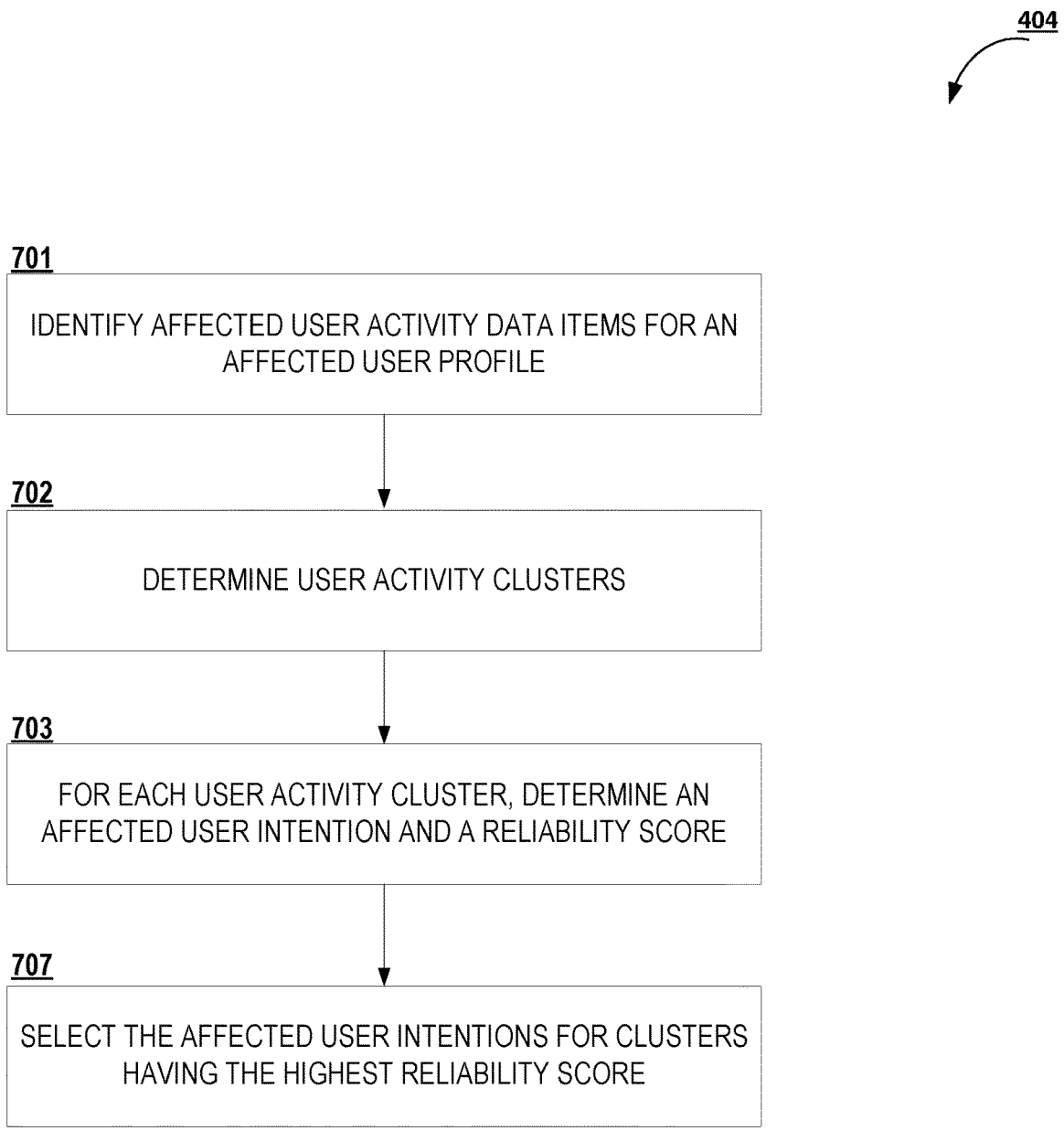

FIG. 7 depicts a flowchart diagram of an example process for determining affected user intent in accordance with some embodiments discussed herein.

Figure 8:

FIG. 8 provides an operational example of identifying user activity clusters in accordance with some embodiments discussed herein.

FIG. 9 provides an operational example of a support communication data structure in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Discussed herein methods, apparatus, systems, computing devices, computing entities, and/or the like for predictive anomaly handling in a service provider system. As will be recognized, however, the disclosed concepts can be used to perform other types of data analysis in service provider systems, such as data analysis for management and/or maintenance of such service provider systems.

Various embodiments of the present invention relate to detecting that particular user interactions with a service provider system are unacceptably slow (e.g., based on one or more operational objectives defined for the system). For example, in a particular user provider system having functionalities including a first functionality vital to user experience, various embodiments may determine that performance of the first functionality is unacceptably degraded. Various embodiments may make this determination based on user activity data items (e.g., user activity logs) and/or based on other operational metrics associated with the service provider system. For example, various embodiments may determine that a first resource within the service provider is vital to performing a first functionality deemed vital to user experience, and may thus determine that user interactions associated with the first functionality are likely unacceptably slow.

Upon detecting that particular user interactions with a service provider system are unacceptably slow, various embodiments of the present invention enable automatic intervention through communication with affected users to enable the affected users to accomplish their objectives. To do so, various embodiments of the present invention detect which users of the service provider system were likely affected by the performance degradations and what the intentions of those users were. For example, various embodiments of the present invention determine affected user profiles and affected user intentions by analyzing user activity data items used to detect the performance degradation in the first place.

Upon determining affected user profiles and affected user intentions, various embodiments of the present invention communicate with the affected user profiles through automatically-generated communications, e.g., automatically-generated chat sessions. Such automatically-generated communications may include information related to accomplishing user objectives. In addition, various embodiments of the present invention enable (e.g., after an unsuccessful automatically-generated communication) communications between human agents and affected users.

A. Technical Problems

Anomaly handling in service provider systems is critical to enhancing user experience in such systems. In many instances, anomalies in such service provider systems hinder one or more components that are integral to servicing user needs. For example, anomalies that compromise the ability of service provider systems to retrieve and/or modify particular data may have implications for user experience of data-intensive tasks in such systems. In some circumstances, affected user requests may be highly time-dependent, such that passage of time will lead to substantial reduction in the perceived utility of the service provider system for the users that seek to access the system to perform the noted affected user requests. In this way, time-consuming handling of system anomalies (through, for example, instructing the user to contact a customer support specialist and/or initiating a customer support communication with the user) may fail to effectively and sufficiently reduce degradations in user experience. Thus, there is typically a temporal consideration in play in relation to issues related to quality of user experience in dealing with service provider system anomalies. Properly addressing such temporal challenges is a major technical problem that various anomaly handling solutions in service provider systems continue to grapple with.

Moreover, in addition to the temporal considerations noted above, user experience may suffer when anomaly handling solutions fail to properly capture and identify sources of system anomaly. In this respect, many existing anomaly handling solutions rely on user feedback as a major source of anomaly source prediction. By obtaining user feedback, such systems typically attempt to base their predictions on first-hand user intentions, inferences, and predictions. However, there is at least two problems associated with determining anomaly sources primarily based on user feedback. First, user feedback may not be an accurate representation of those user interactions that may likely be directly relevant to determining sources of anomalies in service provider systems. For example, the user may not know or may refuse provide accurate observations about user activities and experiences. This may especially be the case in more complex service provider systems where user understanding of the system functionalities may be less than optimal due to system complexity; in service provider systems used by less sophisticated users where user understanding of the nature of user activities and experiences may suffer because of lack of user sophistication; and/or in more time-dependent contexts where user calmness and cooperation with anomaly prediction may suffer because of lack of user attentiveness, user frustration, and/or user stress. In addition to possible lack of accuracy of user feedback, the second problem associated with determining anomaly sources based on user feedback relates to likely degradations in user experience resulting from the often frustrating process of providing information about user intentions, inferences, and predictions. For example, when users have to provide a narrative of their intentions and latest activities to an agent with little understanding of the context of those user intentions and latest activities, the users' perception of the quality of their experience may suffer.

Therefore, in order to provide effective and user-friendly anomaly handling in a service provider system, anomaly prediction systems need to properly identify sources of system anomalies using information other than and/or in addition to user feedback. This means that effective and user-friendly anomaly handling in service provider systems has a strong predictive component that relates to technical challenges in predictive data analysis and pattern recognition domains. For example, there is a continuing technical need for predictive data analysis and pattern recognition solutions that predict sources of system anomalies in service provider systems in a manner that provides an accurate and reliable prediction of such sources while minimizing degradations in user experience, for example degradations in user experience resulting from temporal considerations or from practical shortcomings in identifying appropriate sources of system anomalies in service provider systems.

The technical problems related to predicting sources of system anomalies in service provider systems are multiplied when such systems are more complex, for example when such systems have a more complex hardware and/or software architecture. In more complex service provider systems, there are unique technical challenges related to predicting sources of system anomalies given architectural complexities of such systems. For example, a service provider system may service a large number of users each interacting with a large number of service provider components, where each service provider component includes one or more computing (i.e., software or hardware) resources configured to perform one or more user requests associated with the service provider component. In such systems, even predicting the existence of an anomaly, let alone predicting sources of user anomalies, is a technical challenge. For example, if an anomaly handling solution associated with a complex service provider system having n components and m computing resources and configured to perform j service request types receives an indication of latency in performing a service request having a service request type i, the anomaly handling solution faces technical challenges associated with identifying whether the latency is an indication of a system anomaly, which one or more components of the n components of the service provider system may be a source of a potential system anomaly, which one or more resources of the m resources of the service provider system may be a source of a potential system anomaly, etc. Thus, there is a continuing technical need to properly predict system anomalies, as well as sources of such system anomalies, in more complex service provider systems.

Once an anomaly handling solution in a service provider system predicts system anomalies as well as sources of those anomalies, it faces technical challenges related to translating such predictions (assuming they are reliable predictions) to user intentions, which in turn facilitates providing support service response to predicted user needs. In this respect, a direct translation of anomalies to user intentions may fail to capture complexities associated with how a service provider system utilizes a variety computing resources to process a variety of user requests. The complexity and scale of the technical challenges related to translating predicted anomaly properties to predicted user intentions increases as the complexity and scale of a service provider system increases. For example, more complex systems may have a less discernible and/or a more dynamic mapping of computing resources to performance of particular service requests, which in turn complicates discerning user intentions associated with service requests. Thus, there is a continuing technical need for predicting user intentions based on anomaly predictions and anomaly source predictions, a technical need that also relates to technical challenges in predictive data analysis and pattern recognition domains.

B. Technical Solutions

Various embodiments of the present invention address technical problems associated with predicting system anomaly properties (e.g., sources of system anomalies and/or user intentions associated with system anomalies) in service provider systems by tracking user activity data associated with the service provider system and determining system anomaly properties based on the tracked user activity data. For example, various embodiments may process the last n user activity items based on m properties associated with those user activity items. To perform the processing of the n user activity items, various embodiments of the present invention may apply a machine learning algorithm to determine one or more predictions about sources of system anomalies. For example, various embodiments may cluster the n user activity items using a clustering algorithm to determine, for each cluster, a predicted system anomaly property as well as a reliability score for the predicted system anomaly property. As another example, various embodiments may input the n*m properties associated with the n user activity items to a supervised machine learning model having one or more trained parameters in order to receive, as output of the supervised machine learning model, one or more predicted system anomaly properties as well as a reliability score for each predicted system anomaly property. Then, various embodiments may select, from the predicted system anomaly properties, one or more system anomaly properties having the highest reliability score.

By predicting system anomaly properties using user activity data, various embodiments of the present invention enhance both effectiveness and user-friendliness of prediction of system anomaly properties, such as prediction of sources of system anomalies and/or prediction of user intentions associated with system anomalies. User activity data provide objective data that can supply strong indications of patterns of user interactions with hardware and software resources. Especially when used in combination with complex predictive data analysis and pattern recognition models (such as, for example, supervised machine learning models trained using past system operation data or unsupervised machine learning models trained using various properties related to operational aspects of user activities), user activity data can provide highly relevant and useful information for predicting various system anomaly properties. In this way, user activity data may be highly superior to user feedback data for determining system anomaly properties and being representative of system operations. Moreover, unlike user feedback data that are supplied through direct user interactions, various embodiments of the present invention track user activity data. In doing so, various embodiments of the present invention reduce degradations to user experience associated with direct supplying of user feedback data. Thus, various embodiments of the present invention address technical challenges related to predicting system anomaly properties in an effective and user-friendly manner.

For example, various embodiments of the present invention address technical challenges related to predicting system anomaly sources in a service provider system, such as predicting which system components likely sources of particular system anomalies and/or which system resources that are likely sources of particular system anomalies. Various embodiments predict such system anomaly sources by processing user activity data associated with the service provider system. The proposed solutions may infer system anomaly sources by applying predictive data analysis and pattern recognition models to user activity data, for example by inferring patterns within the user activity data items, where each user activity data item may be defined based on particular properties associated with the user activity data item, and where the particular properties may in turn relate to particular components of the service provider system and/or particular resources of the service provider system.

In one example, if a service provider system has n service provider components, each user activity data item may be characterized by n respective properties, where each property of the n properties describes whether the user activity data item utilizes (e.g., retrieves data from and/or modifies data in) one or more resources associated with a respective service provider component of the n service provider components. Various embodiments of the present invention may then infer patterns within multiple user activity data items based on the n properties associated with each user activity data item to determine one or more predicted component sources for a system anomaly along with a reliability score for each predicted component source. In another example, if a service provider component utilizes m resources, each user activity data item may be characterized by m respective properties, where each property of the m properties describes whether the user activity data item utilizes (e.g., retrieves data from and/or modifies data in) a respective resource of the m respective resources. Various embodiments of the present invention may then infer patterns within multiple user activity data items based on the m properties associated with each user activity data item to determine one or more predicted resource sources for a system anomaly along with a reliability score for each predicted resource source.

Similarly, various embodiments of the present invention address technological challenges related to predicting user intentions associated with system anomalies in system provider systems by processing user activity data associated with the service provider systems. For example, various embodiments may define each user activity data item based on j properties, where each property of the j properties for a user activity item may relate to one or more of a timestamp associated with the user activity item (e.g., a time of initiating a request associated with the user activity item), at least one component of the service provider system utilized by the user activity data item, at least one resource of the service provider system utilized by the user activity data item, an indication of whether one or more system operations associated with the user activity data item were performed successfully, an indication of how the user activity data item relates to past requests by a particular user profile associated with the user activity data item, etc. Various embodiments of the present invention may then infer patterns within multiple user activity data items based on the j properties associated with each user activity data item to determine one or more predicted user intentions associated with system anomalies in the service provider system.

Thus, various embodiments of the present invention address technical challenges related to predicting user intentions associated with system anomalies in system provider systems by processing user activity data associated with the service provider systems. Such predicted user intentions may in turn be used to provide support communications (e.g., proactive support communications initiated without user request for support) to address the predicted user intentions. In this way, various embodiments of the present invention address technical problems associated with performing anomaly detection in service provider systems, such as in complex service provider systems (e.g., by utilizing more complex predictive data analysis and pattern recognition models), in an effective and user-friendly manner.

Furthermore, various embodiments of the present invention address technological challenges related to detecting system anomalies in service provider systems, such as detecting system anomalies in more complex service provider systems, by processing user activity data associated with the service provider systems. Various embodiments of the present invention process user activity data to detect one or more system conditions. Afterward, various embodiments of the present invention determine system anomalies based on the detected system conditions and anomaly detection data, i.e., data associating system conditions to operational objectives for one or more components of the service provider system. For example, various embodiments of the present invention may determine that a combination of one or more system operations indicated by the user activity data indicate that a particular component of the service provider system is failing to meet an operational objective for the particular component of the service provider system. In response to such a determination, various embodiments of the present invention may predict that the service provider system is suffering a particular system anomaly. Various embodiments of the present invention may perform such determinations in part using anomaly detection data. Such anomaly detection data can be used to map predicted system conditions in service provider systems to complex architectural aspects of service provider systems as well as to map complex architectural aspects of service provider systems to system anomalies in service provider systems. In this way, various embodiments of the present invention address technological challenges related to detecting system anomalies in service provider systems, such as detecting system anomalies in more complex service provider systems, by processing user activity data associated with the service provider system.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

The architecture 100 includes one or more client computing entities 102A-D, such as a client computing entity A 102A, a client computing entity B 102B, a client computing entity C 102C, and a client computing entity D 102D. Client computing entities 102A-D (e.g., one or more of the client computing entities 102A-D) interact with a service provider system 105 via a communication network 103. The service provider system 105 includes various storage subsystems 114A-C, such as a user activity data storage subsystem 114A, an application data storage subsystem 114B, and a user identification data storage subsystem 114C. The service provider system 105 further includes a system interface 111, an infrastructure interface 112, an anomaly handling computing entity 106, and a support interface 118.

Each computing entity, computing system, and/or computing resource in the architecture 100 may include one or more of any suitable network server and/or other type of processing device. The communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). Each storage subsystem 114A-C may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In various embodiments, a storage subsystem 114A-C may be configured to store a database, such as a relational database.

The architecture 100 may be used to perform predictive anomaly handling in a service provider system 105 configured to perform service requests by one or more client computing entities 102A-D. For example, in various embodiments, the one or more client computing entities 102A-D may each transmit a service request to the system interface 111 of the service provider system 105 via the communication network 103. The system interface 111 may attempt to perform the services requested by each service request by accessing data (e.g., retrieving data from and/or modifying data in) in the application data storage subsystem 114B of the service provider system 105 using the infrastructure interface 112. In addition, at least one of the system interface 111 and the infrastructure interface 112 may store user activity data associated with operations attempted to be performed in response the service requests in the user activity data storage subsystem 114A of the service provider system 105. The anomaly handling computing entity 106 may use the user activity data in the user activity data storage subsystem 114A to detect an anomaly condition in the service provider system 105 (e.g., an anomaly condition caused by one or more of hardware failures, software failures, and/or the like). In addition, the anomaly handling computing entity 106 may determine one or more affected user profiles associated with the detected anomaly condition based on the user activity data and user identification data in the user identification data storage subsystem 114C. Furthermore, the anomaly handling computing entity 106 may predict one or more user intentions for each affected user profile based on the user activity data. Moreover, the anomaly handling computing entity 106 may generate a support communication for each affected user profile based on the determined one or more user interactions for the affected user profile and application data in the application data storage subsystem 114B. The anomaly handling computing entity 106 may then transmit, using the service interface 118 of the service provider system 105, each support communication to the affected user profile associated with the support communication.

The user activity data storage subsystem 114A may be configured to store the user activity data. The user activity data may include one or more user activity data items, where each user activity data item is associated with at least one system operation attempted to be performed in response to a user request by a client computing entity 102A-D. For example, a user request to a service provider system 105 associated with a medical insurance institution to retrieve gynecologists that are deemed in-network with a user profile associated with the user may be associated with operations pertaining to one of: (i) retrieving first data from a first application database of gynecologists, (ii) retrieving second data from a second application database of medical providers deemed in-network with the user profile, (iii) performing a join of the first data and the second data to generate third data, and (iv) transmitting the third data to the client computing entity associated with the user profile. For each operation associated with one of (i)-(iv), the user activity data may include a user activity data item that describes at least one or more of a nature of the operation, an indication of the service request that caused an attempt to perform the operation, an indication of a user profile associated with the service request that caused the attempt to perform the operation, an indication of one or more components of the service provider system 105 utilized to perform the operation, an indication of one or more computing resources of the service provider system 105 utilized to perform the operation, a timestamp associated with the operation, an indication of whether the operation was successfully performed, an indication of a time period it took to perform the operation, an indication of the speed of performing the operation, etc.

The application data storage subsystem 114B may be configured to store the application data. The application data may include one or more collections of data (e.g., one or more application databases) used to perform one or more service requests by one or more user profiles associated with the service provider system 105. For example, in a service provider system 105 associated with a medical insurance institution, examples of application data collections include medical provider data collections, insurance member data collections, patient medical history data collections, medical claim data collections, etc. In some embodiments, each service request of the one or more service requests associated with the service provider system 105 may be associated with retrieving data from at least one application data collection in the application data storage subsystem 114B and/or modifying data in at least one application data collection in the application data storage subsystem 114B. For example, a service request seeking to change a login password associated with a user profile of the service provider system 105 may be characterized by retrieving existing password information from an authentication database of the application data storage subsystem 114B to authenticate the service request and modifying password information in the authentication database to change the password information. In some embodiments, the application data may include multiple versions of the same collection of data, for example one or more backup or recovery versions of the same collection of data configured to be used by the anomaly handling computing entity 106 in the event of detecting a system anomaly. In some embodiments, the application data storage subsystem 114B may include one or more storage units that are distributed from each other, for example one or more distributed storage units connected to each other using the communication network 103.

The user identification data storage subsystem 114C may be configured to store the user identification data. The user identification data may include one or more user identification data entries, where each user identification data entry associates one or more indications of user identity for a user profile (e.g., an Internet Protocol (IP) address of the user profile, a cookie identification of the user profile, a service provider system 105 identification of the user profile, etc.) with one or more properties of a user profile. In some embodiments, the one or more properties of a user profile include one or more communication accounts associated with the user profile, such as a phone number of the user profile, an email address for the user profile, a messenger application identification for the user profile, a client computing device identification (e.g., an identification associated with a user profile of an Amazon Echo device) for the user profile, etc. In some embodiments, the one or more properties of a user profile include an availability time and/or an availability status associated with each communication account for the user profile. In some embodiments, at least some of the one or more data fields related to indications of user identity for a user profile may be shared between user activity data items and user identification data items, i.e., the user activity data items and the user identification data items may include data fields that use values of similar types to describe user identification.

The system interface 111 is configured to process service requests in order to determine, for each service request, which application data collections stored in the application data storage subsystem 114B should be accessed (e.g., retrieved and/or modified) to perform the service request. In addition, if the service provider system 105 successfully performs a service request, the system interface 111 may transmit one or more outputs obtained by performing the service request to a recipient client computing entity 102A-D associated with the service request. In some embodiments, the system interface 111 is configured to generate one or more user activity data items each associated with one or more particular operations performed by the system interface 111 and/or a particular operation performed by the infrastructure interface 112. In some embodiments, the system interface 111 is configured to store the generated one or more user activity data items in the user activity data storage subsystem 114A. In some embodiments, the system interface 111 is further configured to authenticate that an initiating client computing device 102A-D associated with the service request is authorized to request performance of the service request and/or is authorized to obtain one or more outputs obtained by performing the service request.

The infrastructure interface 112 is configured to access (e.g., retrieve and/or modify) application data collections stored in the application data storage subsystem 114B. In addition, if the infrastructure interface 112 successfully performs a data access related to application data collections stored in the application data storage subsystem 114B, the infrastructure 112 may transmit one or more outputs obtained by performing the data access to the system interface 111. In some embodiments, the infrastructure interface 112 is configured to generate one or more user activity data items each associated with a particular operation performed by the infrastructure interface 112 and/or a particular operation performed by the system interface 111. In some embodiments, the infrastructure interface 112 includes an application programming interface (API) for utilizing services of a database management system (DBMS).

The anomaly handling computing entity 106 is configured to determine whether the service provider system 105 is experiencing an anomaly condition. In some embodiments, the anomaly handling computing entity 106 is configured to determine whether the service provider system 105 is experiencing an anomaly condition based on the user activity data in the user activity data storage subsystem 114A. For example, the anomaly handling computing entity 106 may determine one or more system conditions based on the user activity data. The anomaly handling computing entity 106 may further determine that a first system condition of the one or more system conditions indicates that a first system component of the one or more system components in the service provider system 105 fails to meet at least one operational objective for the first system component and that the first system component is an underlying component of the service provider system 105. Thereafter, the anomaly handling computing entity 106 may determine that the service provider system 105 is experiencing an anomaly condition, e.g., an anomaly condition associated with the first underlying component, the second underlying component, and/or the first system component.

The anomaly handling computing entity 106 is further configured to determine one or more affected user profiles for a detected anomaly condition. For example, the anomaly handling computing entity 106 may identify one or more affected user activity data items stored in the user activity data storage subsystem 114A associated with a detected anomaly condition. The anomaly handling computing entity 106 may further determine, for each affected user activity data item, an affected user profile identification based on one or more particular fields in the user affected activity data item (e.g., one or more data fields determined based on value of tracking pixels in user interfaces presented to user profiles). The anomaly handling computing entity 106 may then query the user identification data in the user identification data storage subsystem 114C based on each affected user profile identification to determine a user profile for the affected user profile identification. In some embodiments, the user profile for an affected user profile identification may include one or more communication accounts associated with the user profile identification. In some embodiments, the user profile for an affected user profile identification may further include, for each communication account of the affected user profile identification, an availability status and/or availability condition associated with the user profile identification.

The anomaly handling computing entity 106 is further configured to determine one or more user intentions for each affected user profile associated with a detected anomaly condition. In some embodiments, the anomaly handling computing entity 106 may identify one or more affected user activity data items stored in the user activity data storage subsystem 114A that are associated with a detected anomaly condition. The anomaly handling computing entity 106 may then determine, for each user profile associated with the detected anomaly condition, a group of the one or more affected user activity data items associated with the particular affected user profile. The anomaly handling computing entity 106 may further determine, based on the group of the one or more affected user activity data items associated with an affected user profile, one or more user intentions associated with the user profile. For example, the anomaly handling computing entity 106 may process the group of the one or more affected user activity data items associated with an affected user profile using a predictive data analysis model and/or a pattern recognition model, such as a predictive data analysis model and/or a pattern recognition model that uses at least one of supervised machine learning and unsupervised machine learning. In some embodiments, the anomaly handling computing entity 106 may determine, for each determined user intention for an affected user profile associated with the determined anomaly condition, a reliability score for the determined user intention.

The anomaly handling computing entity 106 is further configured to generate one or more support communications. The anomaly handling computing entity 106 may generate, for each affected user profile associated with the detected anomaly condition, a support communication for the affected user profile based on at least one of the one or more determined user intentions for the affected user profile. For example, the anomaly handling computing entity 106 may determine a communication account for the support communication, determine a format of the communication account, select a predefined number of user intentions having the highest reliability score, determine a format of a support communication to the communication account based on the format of the communication account, and determine contents of the support communication to the communication account based on the predefined number of user intentions having the highest reliability score. The anomaly handling computing entity 106 may then cause the support interface 118 to transmit the generated support communication to the affected user profile associated with the support communication.

The support interface 118 is configured to transmit support communications generated by the anomaly handling computing entity 106 to client devices 102A-D using the communication network 103. Moreover, the support interface 118 is configured to receive, from the communication network 103, communications from the client devices 102A-D in response to the support communications. In some embodiments, a support communication may initiate a support session (e.g., a chat session), and the support interface 118 is configured to maintain the support session by exchanging communications between the anomaly handling computing entity 106 and the client devices 102A-D using the communication network 103, e.g., using a connection that uses a Transmission Control Protocol (TCP) communication standard.

A. Exemplary Anomaly Handling Computing Entity

FIG. 2 provides a schematic of an anomaly handling computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the anomaly handling computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the anomaly handling computing entity 106 may include or be in communication with one or more processing elements 205 (also referred to as processors, processing circuitry, and/or similar terms used herein interchangeably) that communicate with other elements within the anomaly handling computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the anomaly handling computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, object model, semantic model, graph model, and/or the like.

In one embodiment, the anomaly handling computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the anomaly handling computing entity 106 with the assistance of the processing element 205 and operating system.

As indicated, in one embodiment, the anomaly handling computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the anomaly handling computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the anomaly handling computing entity 106 may include or be in communication with one or more input elements, such as a keyboard input, a mouse input, a touch screen/display input, motion input, movement input, audio input, pointing device input, joystick input, keypad input, and/or the like. The anomaly handling computing entity 106 may also include or be in communication with one or more output elements (not shown), such as audio output, video output, screen/display output, motion output, movement output, and/or the like.

As will be appreciated, one or more of the management computing entity's 100 components may be located remotely from other anomaly handling computing entity 106 components, such as in a distributed system. Furthermore, one or more of the components may be combined and additional components performing functions described herein may be included in the anomaly handling computing entity 106. Thus, the anomaly handling computing entity 106 can be adapted to accommodate a variety of needs and circumstances. As will be recognized, these architectures and descriptions are provided for exemplary purposes only and are not limiting to the various embodiments.

B. Exemplary Client Computing Entity

FIG. 3 provides an illustrative schematic representative of a client computing entity 102A-D that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Provider computing entities 102A-D can be operated by various parties. As shown in FIG. 3, the client computing entity 102A-D can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the client computing entity 102A-D may be capable of operating with one or more air interface standards, communication protocols, modulation types, and access types. More particularly, the client computing entity 102A-D may operate in accordance with any of a number of wireless communication standards and protocols, such as those described above with regard to the anomaly handling computing entity 106. In a particular embodiment, the client computing entity 102A-D may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102A-D may operate in accordance with multiple wired communication standards and protocols, such as those described above with regard to the anomaly handling computing entity 106 via a network interface 320.

Via these communication standards and protocols, the client computing entity 102A-D can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102A-D can also download changes, add-ons, and updates, for instance, to its firmware, software (e.g., including executable instructions, applications, program modules), and operating system.

According to one embodiment, the client computing entity 102A-D may include location determining aspects, devices, modules, functionalities, and/or similar words used herein interchangeably. For example, the client computing entity 102A-D may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the client computing entity 102A-D may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102A-D may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102A-D to interact with and/or cause display of information from the anomaly handling computing entity 106, as described herein. The user input interface can comprise any of a number of devices or interfaces allowing the client computing entity 102A-D to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102A-D and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102A-D can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102A-D. As indicated, this may include a user application that is resident on the entity or accessible through a browser or other user interface for communicating with the anomaly handling computing entity 106 and/or various other computing entities.

In another embodiment, the client computing entity 102A-D may include one or more components or functionality that are the same or similar to those of the anomaly handling computing entity 106, as described in greater detail above. As will be recognized, these architectures and descriptions are provided for exemplary purposes only and are not limiting to the various embodiments.

IV. Exemplary System Operation

The operation of various embodiments of the present invention will now be described. As discussed herein, various embodiments are directed to methods, apparatus, systems, computing devices, computing entities, and/or the like for predictive anomaly handling in service provider systems. In various embodiments, various embodiments of the present invention perform predictive anomaly handling in service provider systems by detecting anomaly conditions in service provider systems based on user activity data, determining predicted user intentions associated with detected anomaly conditions based on user activity data, and/or generating support communications associated with detected anomaly conditions based on predicted user intentions associated with detected anomaly conditions.

FIG. 4 depicts a flowchart diagram of a process 400 for predictive anomaly handling in a service provider system. The process 400 may be performed by a system of one or more computers, such as the service provider system 105. Via the various operations of process 400, the system can, for example, generate support communications associated with detected anomaly conditions based on predicted user intentions associated with detected anomaly conditions.

The process 400 begins at step/operation 401 by identifying service level objectives associated with the service provider system 105. The anomaly handling computing entity 106 may identify the service level objectives based on system configuration data stored in a storage subsystem 114A-C of the service provider system 105. The service level objectives may define one or more metrics for user experience when interacting with the service provider system 105, one or more metrics for operation of at least one component of the service provider system 105, and/or one or more metrics for operation of at least one computing resource of the service provider system 105. In some embodiments, the anomaly handling computing entity 106 may determine the service level objectives based on data received from an external computing entity, e.g., an external computing entity within the service provider system 105 associated with an administrator user profile for the service provider system 105.

For example, the service level objectives may include one or more of a first service level objective requiring that the service provider system 105 performs any service request of a particular service request type within a particular period of time, a second service level objective requiring that a first component of the service provider system 105 performs one or more operations of a particular type within a particular period of time, a third service level objective requiring that a first computing resource of the service provider system 105 must perform one or more operations of a particular type within a particular period of time, a fourth service level objective requiring that the service provider system 105 perform one or more operations of a particular type within a particular period of time, and a fifth service level objective requiring that the service provider system does not produce a number of errors above a certain threshold during a particular period of time.

In some embodiments, a service level objective may be defined for any collection of computing (e.g., hardware and/or software) resources, e.g., for an entire digital asset (e.g., the entire service provider system 105) or for one or more portions of a digital asset (e.g., one or more components of the service provider system 105). In some embodiments, the service level object for a computing resource may be set (e.g., automatically or manually) based on a development and/or deployment timeframe associated with the computing resource. For example, during a particular timeframe from the development and/or deployment of a computing resource, a service level objective related to a response time for the computing resource (e.g., a timeout limit for the entity) may be set to a first value that is higher than the value of the service level objective after the particular timeframe from the initial development and/or deployment of the particular computing resource. The purpose of such techniques may be to detect operational errors associated with the development of computing resources during a short timeframe after the initial development and/or deployment of the computing resources.

At step/operation 402, the anomaly handling computing entity 106 processes one or more user activity data items in accordance with the one or more service level objectives to determine that the one or more user activity data items indicate that the service provider system 105 is experiencing at least one anomaly condition. In some embodiments, the anomaly handling computing entity 106 determines one or more anomaly conditions based on the service level objectives and one or more system conditions based on the user activity data items. Then, the anomaly handling computing entity 106 may determine whether the one or more system conditions include at least one anomaly condition of the one or more anomaly detection conditions. Responsive to determining that the one or more system conditions include at least one anomaly detection condition of the one or more anomaly conditions, the anomaly handling computing entity 106 may determine that the service provider system 105 is experiencing at least one anomaly condition. However, responsive to determining that the one or more system conditions does not include at least one anomaly condition of the one or more anomaly detection conditions, the anomaly handling computing entity 106 may determine that the service provider system 105 is not experiencing at least one anomaly condition.

In some embodiments, to determine one or more anomaly conditions, the anomaly handling computing entity 106 may determine, for each service provider component of the service provider system 105 that includes one or more computing resources configured to process one or more service requests associated with the service provider component, one or more component operational objectives. For example, the anomaly handling computing entity 106 may determine a component operational objective for a service provider component based on one or more of a latency threshold for the service provider component, an error rate threshold for the service provider component, an accuracy threshold for one or more outputs of the service provider component, etc. The anomaly handling computing entity 106 may then determine whether each service provider component is an underlying service provider component of the service provider system 105 (i.e., whether each service provider component is a service provider component that is essential to performing one or more service requests deemed high-priority for the service provider system 105). For example, the anomaly handling computing entity 106 may identify underlying service provider components based on stored data identifying such components and/or based on machine learning models (e.g., trained using historical operational data associated with the service provider system 105) that predict system 105 performance (e.g., deviations from service level objectives) based on hypothetical degradations in performance of particular system 105 components. Examples of underlying service provider components may include service components whose operation is essential for service sign-ups during peak sign-up periods (e.g., during open enrollment periods for health insurance sign-ups) and service components having stringent performance restrictions. In some embodiments, the anomaly handling computing entity 106 determines that a service provider component is an underlying service provider component if the service provider component is configured to perform a high-priority service request and/or is a service provider component that at least one service provider component is functionally dependent on. In response to determining that a service provider component is an underlying service provider component of the service provider system 105, the anomaly handling computing entity 106 may determine an anomaly condition requiring that the service provider component of the service provider system 105 meets each component operational objective for the service provider component.

In some embodiments, to determine one or more anomaly conditions, the anomaly handling computing entity 106 may determine, for each computing resource of the service provider system 105, one or more resource operational objectives. For example, the anomaly handling computing entity 106 may determine a resource operational objective for a computing resource of the service provider system 105 based on one or more of a latency threshold for the computing resource, an error rate threshold for the computing resource, an accuracy threshold for one or more outputs of the computing resource, etc. The anomaly handling computing entity 106 may determine the resource operational objectives for a computing resource based on stored data identifying such objectives and/or based on historical data defining past operations of the resource. In some embodiments, resource operational objectives for a computing resource may be defined based on service level objectives associated with the computing resource and/or with one or more system components that include the computing resource. The anomaly handling computing entity 106 may then determine whether each computing resource is an underlying computing resource of the service provider system 105 (i.e., whether each computing resource is a computing resource that is essential to performing one or more service requests deemed high-priority for the service provider system 105). In response to determining that a computing resource is an underlying computing resource of the service provider system 105, the anomaly handling computing entity 106 may determine an anomaly condition requiring that the computing resource of the service provider system 105 meets each resource operational objective for the computing resource. For example, the anomaly handling computing entity 106 may determine that a database used for performing user authentication retrieves data in an exceedingly slow manner. In response, the anomaly handling computing entity 106 may determine a system anomaly related to retrieval speed of the user authentication database. In some embodiments, the anomaly handling computing entity 106 determines that a computing resource is an underlying computing resource of the service provider system if the computing resource is essential to performing at least one high-priority task associated with an underlying service provider component that the computing resource is a part of.

In some embodiments, the anomaly handling computing entity 106 may determine a system anomaly based on user activity data items associated with the service provider system 105. Examples of user activity data items may include automatically-generated system logs about interaction of the users with one or more components of the service provider system 105, such as system logs that include data fields regarding success or failure of a request by a client computing entity 102A-D to access a system resource, a response time associated with servicing a request by a client computing entity 102A-D, and/or any attempts by users to contact a support entity such as a call center. For example, in some embodiments, the failure of a system 105 component related to user login (e.g., failure of a HealthSafe ID verification in a service provider system 105 affiliated with a medical insurance institution) may trigger generation of system logs that indicate response times for user login and/or call volumes with complaints about user login. As another example, in some embodiments, failure of a system 105 component regarding payment of claims may trigger call volumes with complaints about claim payment failures. The anomaly handling computing entity 106 may determine a system anomaly based on a determination that one or more user activity data items indicate that a condition of the service provider system 105 fails a threshold service level objective for the service provider system 105. For example, the anomaly handling computing entity 106 may determine a system anomaly related to user login if the intensity of complaints regarding the user login exceeds a first threshold value. As another example, the anomaly handling computing entity 106 may determine a system anomaly related to claim payments if the intensity of complaints regarding claim payment exceeds a second threshold value. In some embodiments, the second threshold value may be higher than the first threshold value.

In some embodiments, the steps/operations performed as 402 of FIG. 4 are represented in more detail in FIG. 5. At step/operation 501, the anomaly handling computing entity 106 identifies one or more underlying service components of the service provider system 105. FIG. 6 provides an operational example of a functional dependency graph 600 that can be used to determine one or more underlying service components. The functional dependency graph 600 depicts nodes corresponding to each of a service provider component 1 601, a service provider component 2 602, a service provider component 3 603, a service provider component 4 604, a service provider component 5 605, a service provider component 6 606, and a service provider component 7 607. Of the seven service provider components depicted in the functional dependency graph 600, two (i.e., the service provider component 2 602 and the service provider component 4 604) are marked with a * sign to indicate that those two service provider components are configured to perform high-priority service requests. The determination of those two service provider components may be based on stored data identifying such components and/or based on machine learning models (e.g., trained using historical operational data associated with the service provider system 105) that predict system 105 performance (e.g., deviations from service level objectives) based on hypothetical degradations in performance of particular system 105 components. In some embodiments, the anomaly handling computing entity 106 determines that a service provider component is an underlying service provider component if the service provider component is configured to perform a high-priority service request and/or is a service provider component that at least one service provider component is functionally dependent on.

Moreover, each directed edge from a first node to a second node in the functional dependency graph 600 indicates that a second service provider component corresponding to the second node is functionally dependent on a first service provider component corresponding to the first node. In some embodiments, such a functional dependency relationship between the first service provider component and the second service provider component means that the first service provider component performs at least one operation and/or provides at least one output that is essential to performing one or more service requests associated with the second service provider component, performing one or more high-priority service requests associated with the second service provider component, and/or producing one or more outputs associated with the second service provider component. Furthermore, in some embodiments, if a first service provider component is functionally dependent on a second service provider and the second service provider component is functionally dependent on a third service provider component, the first service provider component is also functionally dependent on the third service provider component. This may be because, while a second output of the second service provider component is essential to performing particular service requests by the first service provider component, a third output of the third service provider component may also be essential to production of the second output by the second service provider component.

Thus, in the functional dependency graph 600, the service provider component 7 607 is functionally dependent on the service provider component 1 601, the service provider component 2 602, the service provider component 3 603, the service provider component 4 604, and the service provider component 5 605. Similarly, the service provider component 6 606 is functionally dependent on the service provider component 1 601, the service provider component 2 602, the service provider component 3 603, the service provider component 4 604, and the service provider component 5 605. The service provider component 5 605 is functionally dependent on the service provider component 2 602 and the service provider component 3 603. The service provider component 4 604 is functionally dependent on the service provider component 1 601 and the service provider component 2 602. Finally, the service provider component 1 601, the service provider component 2 602, and the service provider component 3 603 are not functionally dependent on any service provider components.

In some embodiments, the anomaly handling computing entity 106 determines that a service provider component is an underlying service provider component if the service provider component is configured to perform a high-priority service request and/or is a service provider component that at least one service provider component is functionally dependent on. Thus, based on the functional dependency graph 600, the anomaly handling computing entity 600 may determine that the following service provider components are underlying service provider components: (i) service provider component 4 604, because it is configured to perform at least one high-priority service request; (ii) service provider component 2 602, both because it is configured to perform at least one high-priority service request and because it is a service provider component that the service provider component 4 604 is functionally dependent on; (iii) service provider component 1 601, because it is a service provider component that service provider component 4 604 is functionally dependent on.

Returning to FIG. 5, at step/operation 502, the anomaly handling computing entity 106 determines that a first service provider component fails to meet one or more operational objectives. For example, the anomaly handling computing entity 106 may process user activity data items to determine performance metrics for the first service provider component (e.g., using an integrated or third-party performance monitoring software and/or using operational statistics associated with a rendering software) and use the performance metrics to determine that a first service provider component fails to meet one or more operational objectives. In some embodiments, the anomaly handling computing entity 106 determines the one or more operational objectives for each service provider component based on processing the one or more service level objects in accordance with one or more predictive data analysis models, for example one or more supervised machine learning models trained using historic data associated with the service provider system 105. For example, a predictive data analysis model configured to generate operational objectives may be configured to determine based on historical data that a first increase with a first magnitude in latency of a first service provider component likely causes a second latency with a second magnitude in performing a service request of a particular service request type, and that the second latency fails at least one service level objective associated with the service provider system 105. In another example, a predictive data analysis model configured to generate operational objectives may be configured to determine that a third increase with a third magnitude in latency of a second service provider component deviates from a historic average latency for the second service provider component and that the noted deviation likely causes failure of at least one service level objective associated with the service provider system 105.

At step/operation 503, the anomaly handling computing entity 106 determines whether the first service provider component is an underlying service provider component in accordance with the processes discussed herein. At step/operation 511, in response to determining that the first service provider component is an underlying service provider component, the anomaly handling computing entity 106 detects that an anomaly condition exists in the service provider system 105. At step/operation 512, in response to determining that the first service provider component is not an underlying service provider component, the anomaly handling computing entity 106 detects that an anomaly condition does not exist in the service provider system 105.

Returning to FIG. 4, at step/operation 403, the anomaly handling computing entity 106 determines one or more affected user profiles associated with the detected anomaly condition. In some embodiments, a user profile includes one or more identifications for a user of the service provider system 105. In some embodiments, the anomaly handling computing entity 106 maintains at least one data field in each user activity data item that contains an identification of a user profile associated with the service request associated with the user activity data item. For example, if a service request by a first user profile having a first cookie identification leads to n operations, each user activity data item associated with each of the n operations may include a data field that includes the first cookie identification.

The type of data fields used to identify user profiles in user activity data items may depend on an authentication status of the user profile. For example, before a particular user profile logs in to the service provider system 105, the service provider system 105 may associate user activity data items related to a particular user profile with a cookie identification of the particular user profile. After a particular user profile logs in to the service provider system 105, the service provider system 105 may associate user activity data items related to a particular user profile using an identification of the user profile generated by the service provider system 105. In some embodiments, a user profile includes one or more data fields related to a user (e.g., user authentication information, user authentication status, user contact information, user personal information, indications of past user activities, etc.), where the one or more data fields are identified by at least one user identifier for the user at each time. For example, a user identifier for a user may be identified by a cookie identification of the user at a first time and by a login identification of a user at a second time.

In some embodiments, to determine one or more affected user profiles associated with a detected anomaly conditions, the anomaly handling computing entity 106 identifies any user activity data items associated with the detected anomaly condition (i.e., any affected user activity data items) and extracts any unique user identification data field from the affected user activity data items. For example, if the affected user activity data items include a first user activity data item from a user identification a, a second user activity data item from the user identification a, a third user activity data item from a user identification b, and a fourth user activity data item from a user identification d, the anomaly handling computing entity 106 may determine that user profiles including the user identifications a, b, and c are affected user profiles associated with a detected anomaly condition.

In some embodiments, a type of a user identification data field may designate privileges associated with a user profile. For example, upon an initial interaction with the service provider system 105, a user profile may be identified by a cookie identification. However, after logging into the service provider system 105, the user profile may be identified by a user identification generated by the service provider system 105. In some embodiments, a user profile identified by a cookie identification will not have the privilege to perform certain tasks that require login authorization. For example, in a service provider system 105 associated with a medical insurance institution, a user profile by a cookie identification may have the authorization to access lists of doctors but may have the authorization to access patient-specific medical history information. In some embodiments, the user identification for a user profile is embedded in one or more information packets transmitted by a native application on a client computing device 102A-D associated with the user profile and/or in one or more pixels of a user interface presented using a native application on a client computing device 102A-D associated with the user profile. In some embodiments, the anomaly handling computing entity 106 may determine user identification for an affected user profile using a pixel tracking routine.

In some embodiments, an affected user profile further includes one or more communication accounts associated with a user, such as a phone number of the user, an email address for the user, a messenger application identification for the user, a client computing device identification (e.g., an identification associated with a user profile of an Amazon Echo device) for the user, etc. In some embodiments, an affected user profile further includes an availability time and/or an availability status associated with each communication account for the user profile. For example, the user profile associated with a particular user may include information indicating the particular user associated is available by phone during a first period of time, available by email during a second period of time, and available by a voice-enabled personal assistant device during a third period of time.

At step/operation 404, the anomaly handling computing entity 106 determines one or more affected user intentions for each affected user profile. In some embodiments, the anomaly handling computing entity 106 processes a first number of affected user activity data items associated with each affected user profile to determine one or more affected user intentions for the user profile. The anomaly handling computing entity 106 also determines, for each affected user intention for the user profile, a reliability score. Then, the anomaly handling computing entity 106 selects, from each one or more affected user intentions for an affected user profile, a second number of one or more affected user intentions for the user profile that have the highest reliability score. In some embodiments, to determine affected user intentions and reliability scores, the anomaly handling computing entity 106 processes the affected user activity data items using a predictive data analysis and/or pattern recognition model, such as a model that uses at least one of supervised learning and unsupervised learning.

In some embodiments, a reliability score for an affected user intention may be determined based on an anomaly score of a user activity data item, where the anomaly score for the user activity data item indicates a predicted likelihood that the user activity data item indicates an anomaly of a particular type. For example, the anomaly handling computing entity 106 may detect a first user activity data item denoting low retrieval speed of an authentication database. The anomaly handling computing entity 106 may then determine (e.g., using a machine learning model trained with historical data about operation of the service provider system 105 and/or based on one or more predefined rules) that the first user activity data item indicates with a high degree of likelihood that an anomaly related to user authentication database retrieval exists. Using this determination, the anomaly handling computing entity 106 may then determine with a high degree of certainty that the affected user profile intends to login.

In some embodiments, the anomaly handling computing entity 106 applies a machine learning algorithm to various properties of a first number of affected user activity data items for each affected user profile to determine one or more affected user intentions for the user profile. For example, in some embodiments, the anomaly handling computing entity 106 may cluster n affected user activity items for an affected user profile based on m properties for each affected user activity data item using a clustering algorithm to determine, for each cluster, an affected user intention and a reliability score for the affected user intention. As another example, in some embodiments, the anomaly handling computing entity 106 may input the n*m properties associated with the n affected user activity items for an affected user profile to a supervised machine learning model having one or more trained parameters in order to receive, as output of the supervised machine learning model, one or more affected user intentions for the affected user profile as well as a reliability score for each affected user intention. In some embodiments, each property of an affected user activity data item for an affected user profile may relate to one or more of a nature of one or more operations associated with the affected user activity data item, an indication of the service request that caused an attempt to perform the one or more operations, an indication of a user profile associated with the service request that caused the attempt to perform the one or more operations, an indication of one or more components of the service provider system 105 utilized to perform the one or more operations, an indication of one or more computing resources of the service provider system 105 utilized to perform the one or more operations, a timestamp associated with the one or more operations (e.g., a time of initiating the attempt to perform the one or more operations), an indication of whether the operation was successfully performed, an indication of a time period it took to perform the one or more operations, an indication of the speed of performing the one or more operations, etc.

In some embodiments, the steps/operations performed as 404 of FIG. 4 to determine one or more affected user intentions for a first affected user profile are represented in more detail in FIG. 7. At step/operation 701, the anomaly handling computing entity 106 identifies affected user activity data items for the first affected user profile. In some embodiments, the anomaly handling computing entity 106 identifies user activity data items that are determined to be associated with a detected anomaly condition and that are associated with the first affected user profile. For example, the anomaly handling computing entity 106 may identify as affected user activity data items a group of user activity data items based on which the anomaly handling computing entity 106 detected an anomaly condition in step/operation 402 of FIG. 4. The anomaly handling computing entity 106 may then process one or more user identification fields in each user activity data item of the group of user activity data items to divide the group of user activity data items into one or more subgroups based on the common user identification fields in each subgroup. As an example, the anomaly handling computing entity may divide a group of user activity data items to a first subgroup associated with a user profile a, a second subgroup associated with a user profile b, and so on. After dividing the affected user activity data items into subgroups, the anomaly handling computing entity 106 may select the subgroup that corresponds to the first affected user profile.

At step/operation 702, the anomaly handling computing entity 106 determines one or more clusters of affected user activity data items for the first affected user profile. The anomaly handling computing entity 106 may determine, for each affected user activity data item, any one or more clusters that the affected user activity data item belongs to. The anomaly handling computing entity 106 may cluster the one or more affected user activity data items based on one or more properties associated each affected user activity data item, e.g., in an n-dimensional clustering space where n may correspond to the number of properties of each affected user activity data item or a number of latent properties generated based on the properties of each affected user activity data item using dimensionality reduction.

FIG. 8 provides an operational example of a clustering space 800 for identifying one or more clusters of user activity data items. The clustering space 800 is two-dimensional, having a first dimension (i.e., the X dimension) corresponding to a first property 811 of user activity data items and a second dimension (i.e., the Y dimension) corresponding to a second property 812 of user activity data items. In the clustering space 800, nine user activity data items (i.e., user activity data item 1 801, user activity data item 2 802, user activity data item 3 803, user activity data item 4 804, user activity data item 5 805, user activity data item 6 806, user activity data item 7 807, user activity data item 8 808, and user activity data item 9 809) are mapped to nodes based on their first property 811 and the second property 812. Using a clustering algorithm, the anomaly handling computing entity 106 has generated two clusters of user activity data items, i.e., a first cluster 881 that includes user activity data item 1 801, user activity data item 2 802, user activity data item 4 804, user activity data item 7 807, and user activity data item 8 808; and a second cluster 882 that includes user activity data item 3 803, user activity data item 5 805, user activity data item 6 806, and user activity data item 9 809.

Returning to FIG. 7, at step/operation 703, the anomaly handling computing entity 106 determines an affected user intention for each cluster of affected user activity data items for the first affected user profile and a reliability score for each cluster. In some embodiments, the anomaly handling computing entity 106 determines the affected user intention and reliability for each cluster using one or more rules for determining such values and/or one or more supervised machine learning models trained using historic data about operation of the service provider system 105. For example, the anomaly handling computing entity 106 may supply a measure of statistical distribution (e.g., a mean, median, or mode) of each of one or more properties for affected user activity data items in each cluster to a machine learning model configured to generate a predicted user intention for each cluster and a reliability score for each cluster, where the reliability score for a cluster indicates a measure of confidence in a prediction of a user intention for a cluster of affected user activity data items. The machine learning model may be trained using past data about user intentions. At step/operation 704, the anomaly handling computing entity 106 selects a second number of affected user activity data items associated with the first affected user profile that have the highest reliability score.

Returning to FIG. 4, at step 405, the anomaly handling computing entity 106 generates a first support communication for each affected user profile based on the one or more affected user intentions for the affected user profile. For example, the anomaly handling computing entity 106 may generate a first support communication configured to be transmitted to an available communication account of a corresponding affected user profile that references the one or more affected user intentions for the affected user profile (e.g., in an order defined by the corresponding reliability score for each affected user intention of the one or more affected user intentions) and provides guidance addressing the one or more affected user intentions for the affected user profile given the existence of the anomaly condition.

In some embodiments, the anomaly handling computing entity 106 generates a first support communication for a first affected user profile based on a support communication data structure for the first affected user profile. FIG. 9 provides an operational example of such a support communication data structure 900. The support communication data structure 900 provided in FIG. 9 includes, on the first line, a name of the affected user profile; on the second line, an email communication account of the affected user profile; on the third line, a telephone communication account of the affected user profile; on the fourth line, a preferred method of contact for the affected user profile; on the fifth line, indications of a component of the service provider system 105 sought to be utilized by a service request of the affected user profile; on the sixth line, an indication of an affected user intention associated with the service request of the affected user profile; on the seventh, an indication of the type of anomaly faced by the user when attempting to perform the service request; and on the eight line, an indication of a desired outcome for the service request by the affected user profile.

The anomaly handling computing entity 106 may use any of the one or more data fields in the support communication data structure of FIG. 9 to generate a support communication to an affected user profile and/or one or more parameters of a support communication to an affected user profile. For example, the anomaly handling computing entity 106 may use the name of the affected user profile to generate a greeting field of the support communication to the affected user profile. As another example, the anomaly handling computing entity 106 may use an indication of the affected user intention associated with the service request of the affected user profile and the indication of the type of anomaly faced by the user when attempting to perform the service request to generate main content fields of a support communication to the affected user profile. As yet another example, the anomaly handling computing entity 106 may use the email communication account of the affected user profile, the telephone communication account of the affected user profile and/or the preferred method of contact for the affected user profile to determine one or more parameters of the support communication to the affected user profile that are related to communication means of the support communication. As yet another example, the anomaly handling computing entity 106 may use the email communication account of the affected user profile, the telephone communication account of the affected user profile and/or the preferred method of contact for the affected user profile to determine a format and/or particular contents of the support communication to the affected user profile. Returning to FIG. 4, at step/operation 406, the anomaly handling computing entity 106 causes the service interface 118 to transmit each support communication associated with the user profile to a communication account of the affected user profile (e.g., a communication account of the affected user profile selected based on one or more communication account preference data and/or one or more communication account availability data). In some embodiments, the service interface 118 generates a support communication session (e.g., a chat session including one or more text chat, voice chat, video chat, etc.) between the anomaly handling computing entity 106 and an affected user profile, e.g., using a TCP connection. In some embodiments, the anomaly handling computing entity 106 determines a lack of user satisfaction with a support communication and/or with a support communication session. In some of those embodiments, in response to determining such a lack of user satisfaction, the anomaly handling computing entity 106 notifies a human agent to contact the dissatisfied user profile through a communication account of the dissatisfied user profile and/or causes a human agent to contact the dissatisfied user profile through a communication account of the dissatisfied user profile.

In some embodiments, the anomaly handling computing entity 106 may generate a queuing system for generating and/or transmitting service communications, where the position of a user profile in the queuing system may be determined based on at least one of a time of one or more affected user interactions by the user profiles, a time of detection of one or more anomalies affecting the user profile, a likely importance of one or more intentions of the user profile, etc. The anomaly handling computing entity 106 may also provision new computing resource for generating and/or transmitting service communications. In some embodiments, the anomaly handling computing entity 106 performs at least one of the queue generation and/or new resource provisioning in response to determining that the number of affected user profiles associated with one or more system anomalies exceeds a threshold number.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, the foregoing description provides various examples of utilizing systems and methods for monitoring cognitive capability of a user. However, it should be understood that various embodiments of the systems and methods discussed herein may be utilized for providing reminders of any activity, such as exercising, eating healthy snacks, performing a particular task, calling another individual, and/or the like.

The invention claimed is:

1. A computer-implemented method for anomaly handling in a service provider system, the computer-implemented method comprising:
   detecting, by a processor, an anomaly condition in the service provider system based at least in part on one or more affected user activity data items associated with the service provider system, wherein the service provider system comprises one or more computing resources and detecting the anomaly condition comprises:
   (a) obtaining, for each computing resource of the one or more computing resources, one or more resource operational objectives,
   (b) determining that a first computing resource of the one or more computing resources does not satisfy a first resource operational objective of the one or more resource operational objectives associated with the first computing resource,
   (c) determining whether the first computing resource is a critical computing resource,
   (d) in response to determining that the first computing resource is a critical computing resource, detecting that the anomaly condition exists in the service provider system,
   in response to determining that the first service provider component is not a critical computing resource, detecting that the anomaly condition does not exist in the service provider system;
   determining, by the processor, one or more affected user profiles, wherein each affected user profile of the one or more affected user profiles is predicted to experience the anomaly condition;
   determining, by the processor and for each of one or more first affected user profiles of the one or more affected user profiles, one or more affected user intentions based at least in part on one or more first user activity data items associated with the corresponding first affected user profile, wherein the one or more first user activity data items associated with the corresponding first affected user profile are selected from the one or more affected user activity data items;
   generating, by the processor, a first support communication for each first affected user profile of the one or more affected user profiles based at least in part on the one or more affected user intentions for the first affected user profiles; and
   causing, by the processor, a transmission of each first support communication for the first affected user profiles.

2. The computer-implemented method of claim 1, wherein the service provider system comprises one or more service provider components each configured to perform service requests of one or more service request types and detecting the anomaly condition comprises:
   obtaining, for each service provider component of the one or more service components, one or more component operational objectives;
   determining that a first service provider component of the one or more service provider components does not satisfy at least one first component operational objective of the one or more component operational objectives associated with the first service provider component;
   determining whether the first service provider component is a critical service provider component;
   in response to determining that the first service provider component is a critical service provider component, detecting that the anomaly condition exists in the service provider system; and
   in response to determining that the first service provider component is not a critical service provider component, detecting that the anomaly condition does not exist in the service provider system.

3. The computer-implemented method of claim 2, wherein determining whether the first service provider component is a critical service provider component comprises:
   determining whether the one or more service request types associated with the first service provider component comprise at least one high priority service request type; and
   in response to determining that the one or more service request types associated with the first service provider component comprise at least one high priority service request type, determining that the first service provider component is a critical service provider component.

4. The computer-implemented method of claim 2, wherein determining whether the first service provider component is a critical service provider component comprises:
   identifying one or more first dependent service provider components, wherein each first dependent service provider component of the one or more first dependent service provider components is functionally dependent on the first service provider component;
   determining whether at least one service request type associated with a first dependent service provider component of the one or more first dependent service provider components is high priority service request type;
   in response determining that at least one service request type associated with a first dependent service provider component of the one or more first dependent service provider components is high priority service request type, determining that the first service provider component is a critical service provider component.

5. The computer-implemented method of claim 1, wherein determining whether the first computing resource is a critical computing resource comprises:
   determining whether the computing resource is an essential computing resource for a critical service provider component of the service provider system; and
   in response to determining that the computing resource is an essential computing resource for a critical service provider component of the service provider system, determining that the first computing resource is a critical computing resource.

6. The computer-implemented method of claim 1, wherein determining the one or more affected user profiles comprises:
   determining, based at least in part on each affected user activity data item of the one or more affected user activity data items, an affected user profile identification for the affected user activity data item; and
   determining, based at least in part on each unique affected user profile identification for an affected user activity data item of the one or more affected user activity data items, an affected user profile of the one or more affected user profiles.

7. The computer-implemented method of claim 6, wherein determining an affected user profile identification for an affected user activity data item comprises:
   extracting, from a first pixel of a user interface associated with the affected user activity data item, a first pixel data; and
   determining the affected user profile identification for the affected user activity data item based at least in part on the first pixel data.

8. The computer-implemented method of claim 6, wherein determining the one or more affected user profiles comprises:
   determining, based at least in part on each unique affected user profile identification for an affected user activity data item of the one or more affected user activity data items, a communication account for the unique affected user profile identification; and
   modifying the affected user profile for each unique affected user profile identification based at least in part on the communication account for the unique affected user profile identification.

9. The computer-implemented method of claim 1, wherein determining the one or more affected user intentions for a particular affected user profile of the one or more first affected user profiles further comprises:
   for each first user activity data item of the one or more first user activity data items associated with the particular affected user profile, determining one or more item properties;
   generating one or more item clusters of the one or more first user activity data items based at least in part on the one or more item properties associated with each first user activity data item of the one or more first user activity data items;
   for each item cluster of the one or more item clusters, generating a candidate user intention for the item cluster and a reliability score for the item cluster;
   selecting, from each candidate user intention associated with an item cluster of the one or more item clusters, a first number of candidate user intentions having the highest reliability score; and
   determining the one or more affected user intentions for the particular affected user profile based at least in part on the first number of candidate user intentions.

10. The computer-implemented method of claim 9, wherein generating a candidate user intention for a first item cluster of the one or more item clusters comprises:
    determining one or more measures of statistical distribution for the first item cluster based at least in part on each one or more item properties associated with a first user activity data item in the first cluster; and
    determining the candidate user intention based at least in part on the one or more measures of statistical distribution for the first item cluster.

11. The computer-implemented method of claim 1, determining the one or more affected user intentions for a particular affected user profile of the one or more first affected user profiles further comprises:
    for each first user activity data item of the one or more first user activity data items associated with the particular affected user profile, determining one or more item properties; and
    processing each one or more item properties associated with a first user activity data item of the one or more first user activity data items using a first predictive engine to determine the one or more affected user intentions for the particular affected user profile.

12. The computer-implemented method of claim 11, wherein:
    the first predictive engine is associated with one or more trainable parameters; and
    at least one trainable parameter of the one or more trainable parameters is trained using historical data indicating conclusions about past user interactions with the service provider system.

13. The computer-implemented method of claim 1, wherein generating the first support communication for a particular affected user profile of the one or more first affected user profiles comprises:
    generating, for each affected user intention of the one or more affected user intentions associated with the particular affected user profile, a corresponding field in the first support communication.

14. The computer-implemented method of claim 1, wherein generating the first support communication for a particular affected user profile of the one or more first affected user profiles comprises:
    generating one or more parameters of the first support communication, wherein the one or more parameters comprise at least one communication parameter indicating a selected communication account for transmitting the support communication to the user profile.

15. The computer-implemented method of claim 1, wherein causing the transmission of a first support communication for a particular affected user profile of the one or more first affected user profiles comprises:
    transmitting the first support communication to the particular affected user profile.

16. The computer-implemented method of claim 15, wherein transmitting the first support communication to the particular affected user profile comprises:
    determining a desired communication account for the particular affected user profile based at least in part on information associated with the particular affected user profile; and
    transmitting the first support communication to the desired communication account for the particular affected user profile.

17. An apparatus comprising at least one processor and at least one memory including computer program code, the at least one memory and the computer program code configured to, with the at least one processor, cause the apparatus to:
    detect an anomaly condition in the service provider system based at least in part on one or more affected user activity data items associated with the service provider system, wherein the service provider system comprises one or more computing resources and detecting the anomaly condition comprises:
    (a) obtaining, for each computing resource of the one or more computing resources, one or more resource operational objectives,
    (b) determining that a first computing resource of the one or more computing resources does not satisfy a first resource operational objective of the one or more resource operational objectives associated with the first computing resource,
    (c) determining whether the first computing resource is a critical computing resource, (d) in response to determining that the first computing resource is a critical computing resource, detecting that the anomaly condition exists in the service provider system, in response to determining that the first service provider component is not a critical computing resource, detecting that the anomaly condition does not exist in the service provider system;

determine one or more affected user profiles, wherein each affected user profile of the one or more affected user profiles is predicted to experience the anomaly condition;

determine, for each of one or more first affected user profiles of the one or more affected user profiles, one or more affected user intentions based at least in part on one or more first user activity data items associated with the corresponding first affected user profile, wherein the one or more first user activity data items associated with the corresponding first affected user profile are selected from the one or more affected user activity data items;

generate a first support communication for each first affected user profile of the one or more affected user profiles based at least in part on the one or more affected user intentions for the first affected user profiles; and cause a transmission of each first support communication for the first affected user profiles.

18. The apparatus of claim 17, wherein the service provider system comprises one or more service provider components each configured to perform service requests of one or more service request types and detecting the anomaly condition comprises:

obtaining, for each service provider component of the one or more service components, one or more component operational objectives;

determining that a first service provider component of the one or more service provider components does not satisfy at least one first component operational objective of the one or more component operational objectives associated with the first service provider component;

determining whether the first service provider component is a critical service provider component;

in response to determining that the first service provider component is a critical service provider component, detecting that the anomaly condition exists in the service provider system; and in response to determining that the first service provider component is not a critical service provider component, detecting that the anomaly condition does not exist in the service provider system.

19. A computer program product comprising a non-transitory computer readable medium storing computer readable instructions, the computer readable instructions configured, when executed by a processor, to cause the processor to:

detect an anomaly condition in the service provider system based at least in part on one or more affected user activity data items associated with the service provider system, wherein the service provider system comprises one or more computing resources and detecting the anomaly condition comprises:

(a) obtaining, for each computing resource of the one or more computing resources, one or more resource operational objectives, (b) determining that a first computing resource of the one or more computing resources does not satisfy a first resource operational objective of the one or more resource operational objectives associated with the first computing resource, (c) determining whether the first computing resource is a critical computing resource, (d) in response to determining that the first computing resource is a critical computing resource, detecting that the anomaly condition exists in the service provider system, in response to determining that the first service provider component is not a critical computing resource, detecting that the anomaly condition does not exist in the service provider system;

determine one or more affected user profiles, wherein each affected user profile of the one or more affected user profiles is predicted to experience the anomaly condition;

determine, for each of one or more first affected user profiles of the one or more affected user profiles, one or more affected user intentions based at least in part on one or more first user activity data items associated with the corresponding first affected user profile, wherein the one or more first user activity data items associated with the corresponding first affected user profile are selected from the one or more affected user activity data items;

generate a first support communication for each first affected user profile of the one or more affected user profiles based at least in part on the one or more affected user intentions for the first affected user profiles; and cause a transmission of each first support communication for the first affected user profiles.

* * * * *